United States Patent [19]
Veazie

[11] 3,989,494
[45] Nov. 2, 1976

[54] METHOD FOR MAKING GLASS FIBERS
[75] Inventor: Folsom Munro Veazie, Granville, Ohio
[73] Assignee: Owens-Corning Fiberglas Corporation, Toledo, Ohio
[22] Filed: May 27, 1975
[21] Appl. No.: 580,996

Related U.S. Application Data
[63] Continuation of Ser. No. 468,117, May 8, 1974, abandoned.

[52] U.S. Cl. .......................................... 65/2; 65/12; 65/25 R
[51] Int. Cl.² ........................................ C03B 37/02
[58] Field of Search .................................. 65/1–3, 65/11 W, 11 R, 12, 161, 25 R

[56] References Cited
UNITED STATES PATENTS
3,697,241  10/1972  Strickland ................................ 65/2
3,736,116  5/1973  Russell ..................................... 65/2
3,829,301  8/1974  Russell ..................................... 65/2

Primary Examiner—Robert L. Lindsay, Jr.
Attorney, Agent, or Firm—John W. Overman; Ronald C. Hudgens; Harry O. Ernsberger

[57] ABSTRACT

The disclosure embraces a method of and apparatus for processing heat-softenable material, such as glass, involving treatment of a surface of a substrate or body at which the glass is present such as the surface of a glass stream feeder at the stream delivery region, the method and arrangement involving burning or combusting a combustible carbonaceous material in an environment at the stream delivery region under conditions yielding the formation and deposition of particles of carbon on the surface, the carbon promoting separation of the glass from the surface thereby minimizing or eliminating the tendency for the glass to flood the surface.

2 Claims, 4 Drawing Figures

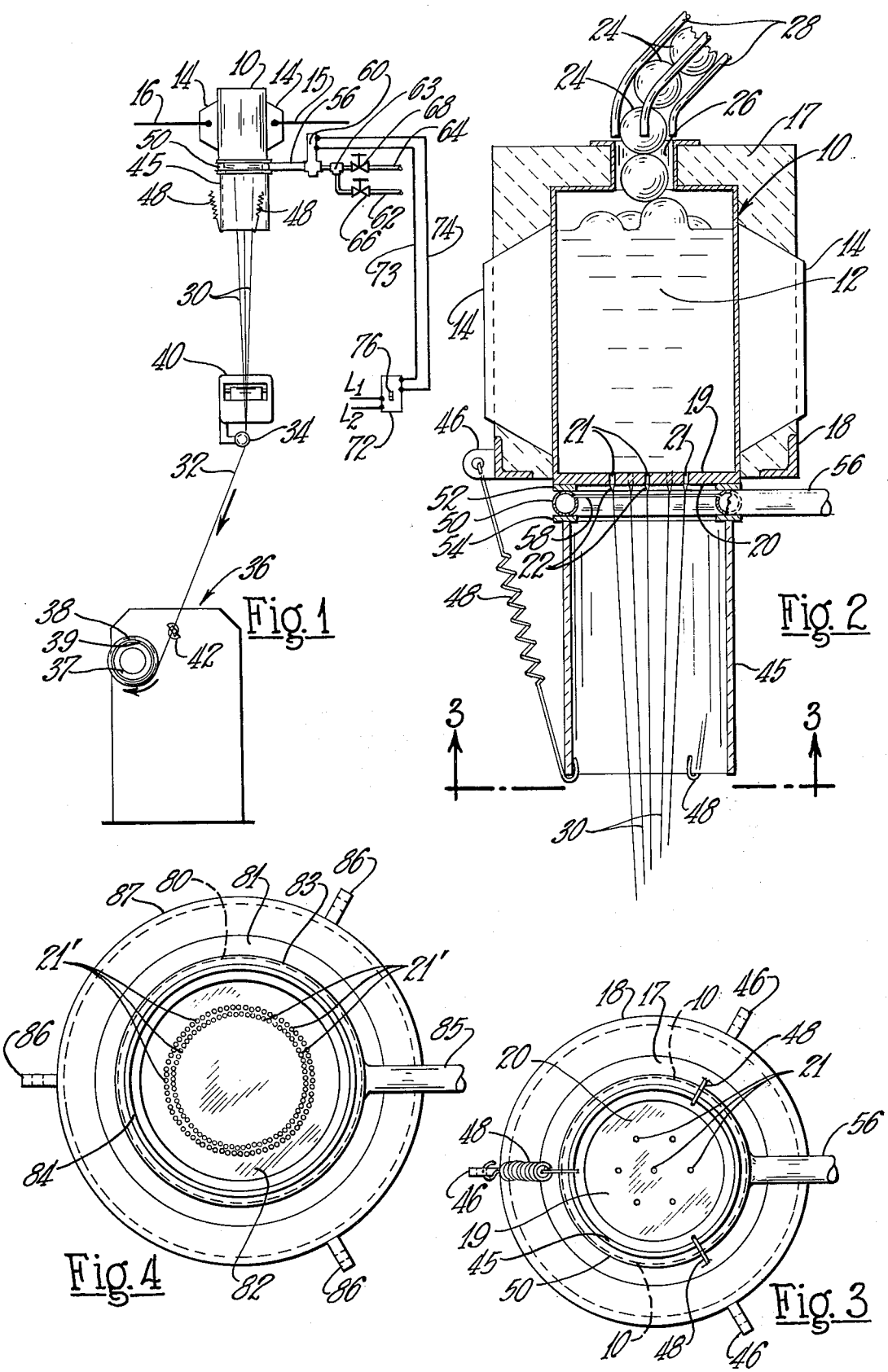

METHOD FOR MAKING GLASS FIBERS

This is a continuation of application Ser. No. 468,117, filed May 8, 1974 now abandoned.

The invention relates to a method of and apparatus for effecting treatment of a surface of a body, substrate or stream feeder at which heat-softened glass is present, the body, substrate or feeder being of a character that tends to be wetted by the glass such as a region of a stream feeder from which flow streams of glass, the method and arrangement involving an environment in which a combustible carbonaceous material is incompletely burned or combusted providing a luminous flame yielding or producing particles of carbon effective at the surface of the body, substrate or feeder to prevent or minimize flooding of the glass at the surface thereby promoting separation of the streams of glass one from another particularly under conditions where the streams are attenuated to fibers or filaments or for other purposes where separation of heat-softened glass from a surface is desirable.

In the formation of streams of heat-softened material, such as glass, flowing through passages or orifices in a stream feeder or bushing, there is a tendency for the heat-softened glass to flow laterally or flood the stream flow region of the feeder surface preventing the formation of individual streams. In initiating stream flow, beads of glass are formed at the stream delivery orifices and when the beads reach a sufficient weight to overcome the surface tension of the glass, the beads fall by gravity with fibers or filaments trailing the beads enabling the initiation of attenuation of the streams to fibers or filaments. The glass, however, during the formation of the beads tends to flood the feeder surface thus joining the beads or the streams impairing the flow of individual streams and hence interrupting attenuation where the streams are being attenuated to fibers or filaments.

Stream feeders are fashioned of materials or alloys capable of withstanding the high temperature of the heat-softened glass, the feeders being preferably made of platinum-rhodium alloy, nickel-tungsten alloy or a nickel-chrome-iron alloy, and molten glass tends to wet the surface of a body, substrate or feeder made of such materials. Heretofore, it has been a usual practice to provide spaced depending projections on a feeder floor, each projection having an orifice through which flows a stream of heat-softened glass.

The provision of the orificed projections tends to retard the glass from wetting or flooding the surface of the bushing or feeder but at times the glass will flood and impede the formation of separate streams and thus interrupt attenuation of the streams to fibers or filaments. In usual stream feeder constructions, the adjacent depending orificed projections are in juxtaposed or close relation in order to provide a desired number of streams of glass. The closeness of the depending projections fosters the tendency of the molten glass to flood along the feeder surface because the tendency of the molten glass to wet the feeder surface is greater than the tendency of the molten glass to cohere into a drop or bead formation.

The invention embraces a method of processing glass by establishing an environment at the stream flow region of a body, substrate or feeder by burning or combusting a combustible carbonaceous material at the stream flow region under conditions promoting incomplete combustion thereby fostering the formation or production of particles of carbon, the carbon particles forming a coating at the surface effective to promote separation of the heat-softened molten glass from the body, substrate or feeder.

The invention embraces a method for treating a body, substrate or feeder surface from which flow streams of heat-softened glass where the glass has a tendency to spread or flood over the surface from which the streams flow, the method involving incomplete combustion of a combustible carbonaceous gas providing a reducing flame or luminous flame yielding particles of carbon effective at the interfacial region of the surface with the heat-softened glass to promote separation of the glass from the surface.

The invention embraces a method of and apparatus for flowing streams of glass from orifices in a substrate or stream feeder involving shielding the stream flow region of the substrate or feeder introducing or feeding a combustible carbonaceous material such as a hydrocarbon gas into the shielded region with only sufficient air to effect an incomplete burning or combustion of the combustible material so as to yield fine particles of carbon deposited on the surface of the substrate to foster separation of the glass from the substrate and promote the flow of the glass in separated or discrete streams which may be attenuated to fibers or filaments.

Another object of the invention resides in a method of and apparatus for controlling heat-softened glass wherein streams of the glass are flowed from orifices in a substrate or feeder of a character where the glass has a tendency to spread over the substrate or feeder surface, the method and arrangement involving the incomplete combustion of a combustible carbonaceous gas under controlled conditions at the stream delivery region of the surface whereby the incomplete combustion of the gas yields carbon particles at the substrate or feeder surface effective to substantially eliminate flooding of the glass and thereby reduce the size of the beads of glass at the orifices during start-up of stream flow operations and accelerate stream formation.

Another object of the invention embraces a method of controlling heat-softened glass wherein streams of the glass are flowed from orifices in a feeder surface, the method involving establishing a reducing flame or luminous flame by incomplete combustion of a carbonaceous gas at the region of the orificed surface, the flame yielding particles of carbon or soot effective at the surface to reduce flooding whereby the orifices may be closely spaced to obtain an increased number of streams of glass from a given area and thereby increase the production of fibers or filaments attenuated from the streams.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is a semischematic view of an arrangement for flowing streams of glass and attenuating the streams to filaments, the arrangement embodying a combustion environment at the stream delivery region;

FIG. 2 is a sectional view of the stream feeder and combustion environment at the stream flow region;

FIG. 3 is a bottom plan view of the arrangement shown in FIG. 2, the view being taken on the plane 3—3 of FIG. 2, and FIG. 4 is a view similar to FIG. 3 showing an arrangement of a large number of stream flow orifices in the feeder floor.

While the method of the invention is especially adapted for use with a substrate or feeder provided with a plurality of orifices for flowing streams of glass to eliminate or reduce the tendency of the glass to flood, it is to be understood that the method may be utilized at a region of flowing glass where it is desired to promote the separation of the glass from a surface normally wetted by the glass.

Referring to the drawings in detail and initially to FIG. 1, there is illustrated a stream feeder or bushing 10 adapted to contain heat-softened fiber-forming material such as glass 12. The feeder 10 is fashioned of a material or alloy capable of withstanding the high temperatures of molten glass, an alloy of platinum or rhodium being satisfactory for the purpose. A nickel-tungsten alloy, a nickel-chrome-iron alloy or a high temperature resistant ceramic may also be used for the feeder.

In the embodiment illustrated, the feeder or bushing 10 is of circular cylindrical shape and is equipped with diametrically opposed terminal lugs 14 for connection with current supply conductors 15 and 16. The feeder 10 is preferably encased in refractory 17 supported by a frame 18, the refractory 17 minimizing heat loss from the feeder. The feeder 10 has a floor, floor section or substrate 19 provided with a plurality of stream flow passages, openings or orifices 21. Streams 22 of glass flow through the orifices, the glass of each stream adjacent the exterior surface 20 of the feeder floor 19 being in the form of a cone as shown in FIG. 2.

The glass introduced into the feeder or bushing 10 may be in the form of spherical marbles or pieces 24 of prerefined glass, a supply of the marbles being contained within a receptacle or hopper (not shown). The spheres or marbles 24 of glass are conveyed from the receptacle to an entrance passageway 26 in the roof section of the feeder by a guide chute 28 of conventional character.

In the arrangement illustrated, the marbles of glass may be reduced to a softened or molten state by electric current flow through the feeder 10, or the feeder may be attached to a forehearth of a melting furnace and receive molten glass directly from the forehearth.

The streams 22 of glass may be attenuated to fibers or filaments, and FIG. 1 illustrates one arrangement for attenuating the streams to continuous filaments 30 by winding a strand 32 of the filaments into a package. The filaments 30 are converged into a strand by means of a gathering shoe 34. A winding machine 36 supports a rotatable collet 37, the winding collet being rotated by a motor (not shown). The strand 32 is wound into a package 38 on a thin-walled forming tube 39 removably mounted on the collet 37. The winding collet is rotated at a speed to attenuate the glass streams to filaments at a linear rate of upwards of 10,000 or more feet per minute.

An applicator 40 may be disposed to be engaged by the filaments 30 in advance of the gathering shoe 34 for applying sizing or other coating material onto the filaments. A rotatable and reciprocable traverse 42 mounted by the winding machine 36 engages the strand 32 for oscillating the strand to effect a crossing of the individual wraps or convolutions of strand during collection of the strand into a package. The traverse means 42 is of conventional character such as that shown in the U.S. Pat. No. 2,391,870 to Beach.

The invention embraces a method of and apparatus for establishing an environment at the stream flow region of the feeder or substrate to substantially eliminate or minimize the tendency of the heat-softened glass to flood along or across the surface 19 of the feeder or substrate ans isolate or separate the streams one from another whereby the streams may be attenuated into individual fibers or filaments and restarting of attenuating operations rapidly resumed following a filament "break-out."

The method and arrangement involves incomplete combustion or burning of a combustible carbonaceous material adjacent the substrate or feeder surface under conditions wherein the burning or combustion promotes the formation of or yields fine particles of carbon, the carbon being effective at the feeder or substrate surface 19 to minimize or substantially eliminate wetting of the surface by the glass and thereby reduce or eliminate the tendency of the glass to flood at the surface and promote separation or isolation of the beads of glass forming at the orifices during start-up of attenuating operations.

It has been found that by establishing partial or incomplete combustion or limited oxidation of a combustible organic or carbonaceous gas, there is provided a luminous or reducing flame, viz. a flame yielding carbon particles, and that carbon particles continue to be formed during the incomplete combustion or oxidation of the combustible carbonaceous gas whereby such particles of carbon form a coating or film on the feeder surface 19.

Through the use of the luminous flame, the beads of viscous glass, formed at the stream flow orifices at start-up or pursuant to filament break-outs, tend to remain discrete or do not adhere or stick together though they may be in contact one with another. It is believed that an infinitely thin film of carbon is deposited on the surfaces of the beads of glass as well as on the feeder or substrate surface 20. Hence, when the beads fall and filaments trail the falling beads, the streams of glass and the filaments remain individual as the tendency of the glass to flood along the surface 20 is prevented by the coating of carbon particles.

One form of apparatus for establishing an environment of incomplete combustion or partial oxidization of a combustible carbonaceous material such as a hydrocarbon gas is inclusive of a shield, shroud or enclosure 45 disposed adjacent and extending downwardly from the feeder 10 and being open at the lower end. In the embodiment illustrated, the enclosure 45 is supported by contractile members or springs 48 from projections 46 on the frame 18.

Disposed at the upper end region of the enclosure 45 and adjacent the feeder floor 19 is a circular tubular manifold, burner member or burner 50. Disposed between the burner member 50 and the feeder floor 19 is an annular member 52, and disposed between the burner member and the upper end of the enclosure 45 is a similar annular member 54. The annular members 52 and 54 are of high temperature resistant material to facilitate expansion and contraction of the burner member 50 which is subjected to varying temperature conditions. The members 52 and 54 are fashioned of a high temperature resistant composition such as an alumina silica glass in fibrous form.

The circular burner or manifold 50 is connected with a supply tube or pipe 56 for feeding a combustible organic or carbonaceous gas or a mixture of carbonaceous gas and air to the burner. The interior wall region of the circular burner 50 is provided with a narrow circular slot or orifice 58 as shown in FIG. 2, the circular orifice 58 being disposed to deliver a combustible carbonaceous gas or a mixture of a combustible carbonaceous gas and air upwardly toward the surface 20 of the stream feeder.

The supply tube or pipe 56 is connected with a valve means 60 for controlling the flow of the combustible carbonaceous gas or mixture of combustible carbonaceous gas and air to the burner. Air under very low pressure may be supplied to the pipe 56 through a supply pipe 62 and a fitting 63, and a combustible carbonaceous gas conveyed from a supply through a pipe 64 and fitting 63 to the pipe 56. A regulating valve 66 is associated with the air supply pipe 62 for cutting off or regulating the air flow, the pipe 64 being provided with a regulating valve 68 for regulating the flow of combustible carbonaceous gas to the pipe 56.

The control valve means or valve 60 may be of a conventional solenoid-operated type wherein the valve is normally closed by gravity or spring pressure and is opened by energization of a solenoid coil. Means is associated with the valve 60 for operating the valve. Current conductors L1 and L2 are connected with a conventional current supply and with a switch or switch means 72. The switch means 72 is connected with the solenoid of the valve means 60 by conductors 73 and 74. The switch means 72 includes a toggle member 76 adapted to be manipulated by an operator to open or close the valve means 60.

The combustible carbonaceous material may be a combustible hydrocarbon gas or mixture of hydrocarbon gases adapted to be partially or incompletely burned or combusted adjacent the substrate or feeder surface 20 at the glass stream flow region. The combustible mixture is spontaneously ignited exteriorly of the burner orifice 58 by the high temperature of the feeder and glass streams which may be 2000° F. or higher. The high temperature environment renders a special ignition means unnecessary.

Through the incomplete burning or combustion of a combustible carbonaceous material or hydrocarbon a reducing flame or luminous flame is produced, the partial or incomplete combustion yielding fine particles of carbon which are deposited on the substrate or feeder surface 20 providing a coating of carbon promoting or preventing wetting of the surface 20 by the molten glass and hence preventing or minimizing flooding of the glass by the nonwetting characteristics of the carbon.

The combustible hydrocarbon gas is under very low pressure and air supplied with the combustible gas is under very low pressure. Hence, the luminous flame provided by the incomplete combustion of the hydrocarbon gas is a lazy flame of very low or inappreciable velocity so that it does not impair the delivery of the glass streams from orifices in the feeder floor 19. There is, however, sufficient movement of the flame and gases of combustion to prevent an excessive build-up of carbon particles on the floor surface 20, the excess particles of carbon being conveyed away by the gases of combustion moving downward and through the open end of the enclosure 45.

Various combustible hydrocarbon gases may be employed for producing the luminous or reducing flame such as propane, methane, ethane, butane, isobutane, ethylene, propylene, acetylene, cyclopropane and naphthene or other similar combustible organic gases. However, such gases as methane, propane and butane are preferred because they are readily available and render the method or process more economical.

Where the hydrocarbon gas and air are mixed at the fitting 63, the proportion of hydrocarbon gas and air is regulated by the valves 66 and 68 to provide a combustible mixture containing an excess of hydrocarbon gas to foster partial or incomplete combustion of the hydrocarbon so that carbon particles are formed and deposited on the surface 20 in the form of a carbon coating.

Under certain operating conditions a hydrocarbon gas may be supplied to the burner 50 and partial or incomplete combustion occurs with the air entering the open lower end of the enclosure or shield 45 to yield carbon particles for deposition on the feeder surface 20.

The enclosure 45 is desirable in order to provide for partial or incomplete combustion under controlled conditions in order to promote effective formation and distribution of carbon particles over substantially the entire area of the surface 20. Thus, the hydrocarbon and air delivered to the burner 50 may be regulated by the valves 66 and 68 to effectively control the extent of incomplete or partial combustion to thereby control the yield or production of carbon particles from the luminous or reducing flame. Such control is further enhanced by reason of shielding the combustion environment by the enclosure 45.

It is to be understood that a hydrocarbon gas, either by itself or mixed with air supplied through the pipe 62, may be delivered from the burner orifice 58 and the hydrocarbon gas incompletely burned in open air or unconfined environment as a luminous flame yielding or producing carbon particles in the stream flow region. However, without the isolated environment provided by the enclosure 45 or similar environment isolating means, control of the deposition of carbon particles is rendered difficult as ambient air currents at the glass stream flow region of the surface 20 may result in certain areas being devoid of carbon particles so that the antiwetting characteristics under such conditions may not be uniform.

A combustible mixture of hydrocarbon gas and air may be supplied to the burner 50 by aspiration. The hydrocarbon gas under low pressure is supplied to the pipe 64 and flows through the fitting 63 and pipe 56 to the burner 50. The air supply tube 62 is open to the atmosphere and, as the hydrocarbon gas flows through the fitting 63, air from pipe 62 is aspirated into the hydrocarbon gas to form a combustible mixture. The proportion of combustible gas to air may be accurately regulated by the valves 66 and 68 to provide a mixture which will be incompletely burned or combusted at the glass stream flow region.

The valve means 60, which is controlled by the switch 72, enables the controlled use of the luminous or reducing flame. In start-up operations following a filament break-out, the valve 60 is opened by manipulation of the switch member 76 to effect delivery of the combustible carbonaceous material per se or combustible carbonaceous material and compressed air from the manifold or burner orifice 58.

The combustible carbonaceous material is immediately ignited by the high temperature of the glass and incomplete or partial combustion occurs providing a luminous flame or reducing flame, yielding or producing the carbon particles deposited on the surface 20. The antiwetting characteristics of the carbon promote the formation of independent beads of glass at the orifices which fall by gravity with filaments trailing the beads.

The operator grasps the group or strand of trailing filaments and initiates winding of the strand on the mandrel 37 to re-start the attenuating operation. After attenution is initiated, the operator may manipulate the switch member 76 to close the valve means 60 and interrupt or cut off the flow of carbonaceous material to the burner 50 as attenuation usually causes the glass streams to remain separated and flooding may not occur.

However, the luminous flame or reducing flame may be maintained during attenuation so that in event of filament break-out, the coating of carbon particles on the surface 20 will prevent or minimize flooding so that the time required for the formation of the glass beads at the orifices and bead drop time may be reduced.

The enclosure or shield 45 may be made of heat resistant incombustible material such as fused silica.

FIG. 4 illustrates a modified feeder floor or substrate. In this form the feeder 80 is of larger diameter and the feeder floor or substrate 82 is of larger diameter. The feeder 80 is embraced in refractory 81 of the character shown at 17 in FIG. 2. The construction shown in FIG. 4 is inclusive of a burner or manifold 83 and a tubular enclosure or shield 84 of larger size than the corresponding components shown in FIG. 3. The enclosure or shield 84 is supported by contractile springs connected with projections 86 on a frame member 87, the latter corresponding to the frame member 18 shown in FIG. 2.

The manifold is provided with a pipe 85 for conveying combustible carbonaceous material with or without air to the burner or the manifold 83 for delivery through the burner orifice as in the arrangement shown in FIG. 2. In the form shown in FIG. 4, the feeder floor or substrate 82 is provided with a comparatively large number of orifices 21' through which flow streams of glass.

The carbonaceous material is incompletely burned or combusted in the region of the surface of the feeder floor or substrate to yield carbon particles which are deposited on the surface of the feeder floor or substrate 82 preventing or minimizing flooding of the glass at the surface to enable the flowing of independent streams of glass from the orifices for attenuation to filaments by winding a group or strand of the filaments into a package on a winding machine as illustrated in FIG. 1.

The valve arrangement for control of the combustible organic or carbonaceous material and air illustrated in FIG. 1 may be used with the stream feeder arrangement shown in FIG. 4. The antiwetting characteristics provided by the carbon particles resulting from incomplete or partial combustion of carbonaceous material adjacent the floor or substrate 82 enable the positioning of the orifices 21' in closely spaced relation whereby the individual streams of glass may be maintained and do not tend to flood along the surface of the substrate or feeder floor 82.

It is to be understood that while a cylindrical stream feeder construction is illustrated in the drawings, the feeder construction and the feeder floor or substrate may be of rectangular shape or of other shape, if desired. Where a different shape of feeder floor or substrate is employed, the enclosure or shield 45, 48, and the burner manifold 50, 83, conform to the shape of the feeder floor or substrate so that the luminous flame or reducing flame is effective throughout the area of the substrate or feeder floor to promote uniform deposition of carbon particles on the feeder floor and minimize or eliminate flooding of the glass throughout the feeder floor or substrate surface area.

It is apparent that, within the scope of the invention, modifications and different arrangements may be made other than as herein disclosed, and the present disclosure is illustrative merely, the invention comprehending all variations thereof.

I claim:

1. The method of controlling heat-softened glass in a fiber forming process including flowing streams of the glass from orifices in a stream feeder, feeding a mixture of hydrocarbon gas and air adjacent the stream flow surface region of the feeder wherein the amount of air in the mixture is insufficient to attain complete combustion of the hydrocarbon gas, and effecting incomplete combustion of the hydrocarbon gas at the stream flow region providing a luminous flame yielding particles of carbon deposited on the stream flow surface of the feeder wherein the carbon promotes separation of the heat-softened glass from the stream flow surface of the feeder.

2. The method of controlling heat-softened glass in a fiber forming process including flowing streams of the glass from orifices in a surface of a stream feeder, shielding the stream flow region of the feeder, feeding a hydrocarbon gas and air into the shielded region, proportioning the ratio of the hydrocarbon gas to the air wherein the amount of air at the shielded stream flow region is insufficient to attain complete combustion of the hydrocarbon gas, and effecting incomplete combustion of the hydrocarbon gas in the shielded stream flow region providing a luminous flame yielding particles of carbon deposited on the feeder surface at the stream flow region to promote separation of the heat-softened glass from the feeder surface.

* * * * *